Oct. 1, 1974  R. W. PARKINSON  3,839,531
METHOD FOR MAKING A RETAINING RING FOR AN ANTIFRICTION BEARING
Filed Dec. 29, 1972
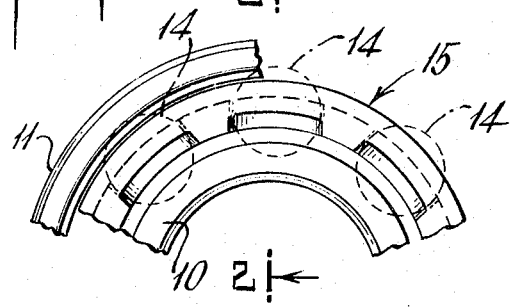
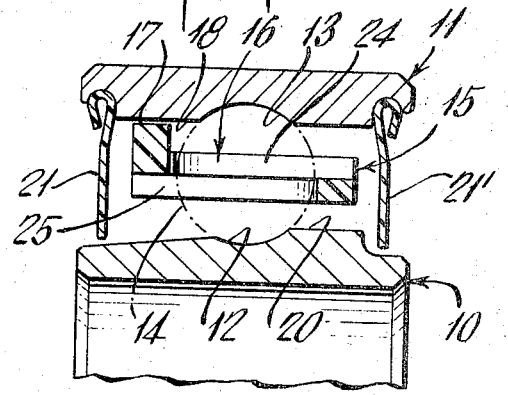
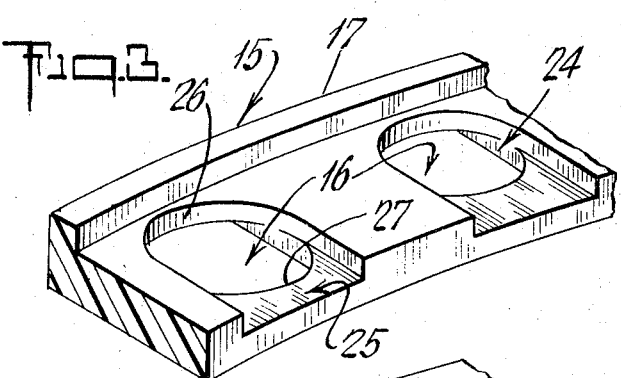
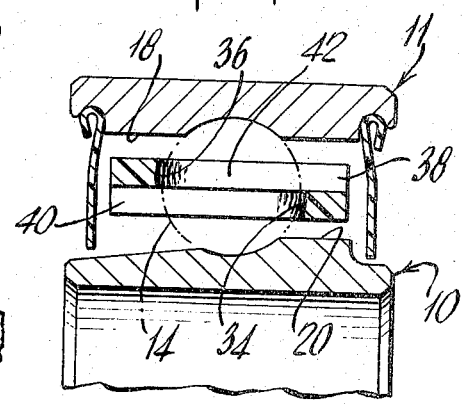
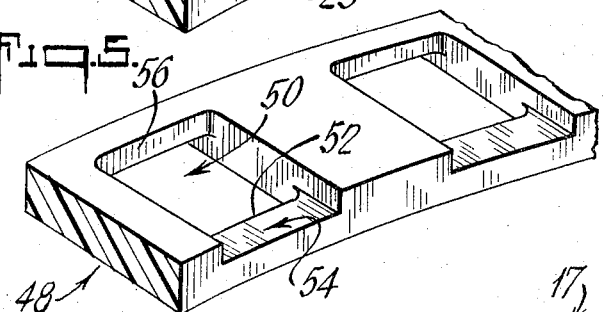
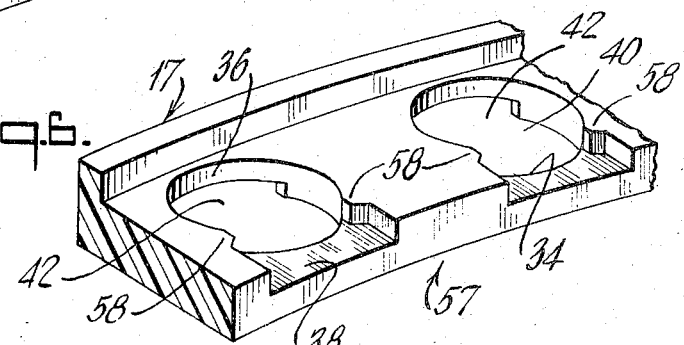
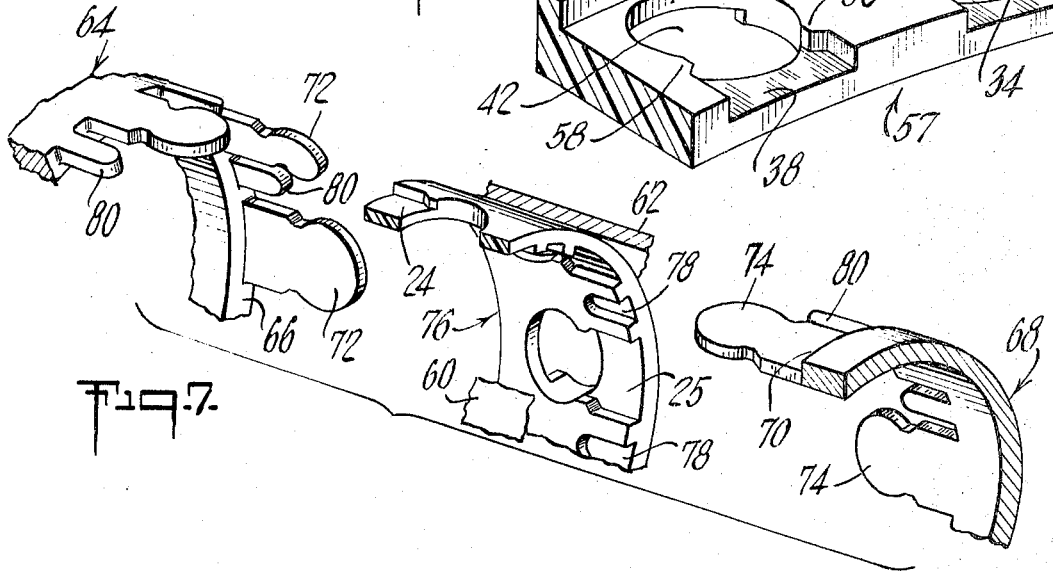

3,839,531
METHOD FOR MAKING A RETAINING RING FOR AN ANTIFRICTION BEARING
Roger W. Parkinson, Plainville, Conn., assignor to Textron, Inc., Providence, R.I.
Filed Dec. 29, 1972, Ser. No. 319,527
Int. Cl. B29f 1/022
U.S. Cl. 264—328     2 Claims

ABSTRACT OF THE DISCLOSURE

The invention relates to an injection molding method in which radially continuous openings are defined in a molding ring construction by axially slideable engagement of core pieces. The construction lends itself particularly well to simplified mold parts for mass-production by injection-molding of plastic. The particular mold parts need only be axially aligned and axially displaced, into and out of their mold-cavity defining relation, and yet their particular relationship is such as to form element-retaining pockets, contoured for ball-retention or for roller-retention as may be desired, and open on the radial alignment of the axis for each pocket.

---

This invention relates to the technique for the construction of a retainer for an antifriction bearing.

It is an object of the invention to provide an improved technique of the character indicated.

Another object is to provide such a technique particularly applicable to mass-production by injection-molding of a suitable plastic material.

It is a general object to meet the above objects with a technique lending itself to extreme economies of manufacture, without sacrifice of operating effectiveness, for extended life under high-speed conditions.

Other objects and various further features of novelty and invention will be pointed out or will occur to those skilled in the art from a reading of the following description in conjunction with the accompanying drawings. In said drawings, which show, for illustrative purposes only, preferred forms of the invention:

FIG. 1 is a fragmentary view in side elevation of an antifriction bearing incorporating a retaining ring of the invention;

FIG. 2 is an enlarged fragmentary sectional view taken at 2—2 in FIG. 1;

FIG. 3 is a fragmentary perspective view of the retainer in the bearing of FIGS. 1 and 2;

FIGS. 4 and 5 are views similar to FIGS. 2 and 3, to illustrate modifications;

FIG. 6 is a view similar to FIGS. 3 and 5 to show a further modification; and

FIG. 7 is an exploded, simplified, fragmentary view in perspective to show cooperating mold parts and the product of such parts.

In FIGS. 1, 2 and 3, the invention is shown in application to an antifriction bearing comprising inner and outer rings 10–11, with opposed raceways 12–13, and a plurality of antifriction elements 14 riding the raceways. A retaining ring 15 of the invention has plural angularly spaced pockets 16 for elements 14 and includes projecting means, such as a circumferentially continuous radially outward flange 16 at one axial end, for running clearance with and stabilized piloting on an adjacent land 18 of the outer bearing ring 11. Alternatively, the ring may include a radially inward flange which pilots on a land 20 of the inner ring 10. Regardless of the bulk or radial extent of projecting retainer-body formations, such as flange 17, they are accommodated within the interior clearance between the end closures of the bearing, as at shields 21–21'.

The retaining ring 15 is a single-piece integral injection-molded plastic part of suitable material, as, for example, the self-lubricating, internally reinforced thermoplastic such as Nylon 66; specifically, for an 8-pocket ball bearing having a locus of centers of 5/32-inch balls on a circle of about 5/8-inch diameter, the use of Nylon 66 has been found to be satisfactory for high-speed textile-machinery uses.

Basically, the ring 15 comprises an annular body in which the spaced pockets 16 are defined by the intersection of axially overlapped and angularly registering, radially inner and outer grooves 24–25 of limited axial extent. The outer radius of the inner grooves 24 is substantially equal to the inner radius of the outer grooves 25, and the width of each groove is of substantially and effectively the angular extent subtended by one antifriction element; since elements 14 are balls in the form shown, the angular width of the grooves is slightly in excess of the ball diameter. The outer grooves 25 are seen to be axially continuously open to the right axial end of the body of ring 15, and to be closed at 26 at the other axial end; similarly, the inner grooves 24 are axially continuously open to the left axial end and are closed at 27 at the right axial end. Finally, the extent of axial overlap of each pair of grooves 24–25 is slightly in excess of the ball 14 diameter, being the effective axial extent subtended by an antifriction element. As shown, the closed end 26 substantially coincide with the axially inner radial surfaces of the adjacent end flange 17.

When balls are used as antifriction elements as in FIG. 3, the overlapped grooves 24 and 25 are semi-cylindrical at their axially inward ends 26 and 27. The radii of the curved end surfaces of a pair of overlapping inner and outer grooves may be drawn from a common radially extending axis. Thus, the profile of the pocket is circular along a radially directed axis of the retaining ring 15.

FIG. 4 shows a retaining ring 30 similar to that of FIG. 3 in which the radially projecting flange 17 is omitted. Thus the retaining ring 30 is spaced apart from, although concentric with, the inner and outer rings 10 and 11. Instead of piloting on the land 18 of the outer ring 11, the retaining ring is maintained in concentric relation in this embodiment by piloting on the curvature of the balls 14. This is accomplished by contouring the curved inward end surfaces 34 and 36 so that the grooves 38 and 40 have a greater axial extent in the plane where the inner and outer grooves overlap then when measured along the radially inner and outer surface of the retaining ring 30. Thus, the shape of the pocket 42 will accommodate the full diameter of the ball 14 in a direction axial with respect to the retaining ring 30 only when the retaining ring is substantially concentric with the inner and outer rings 10 and 11.

An embodiment of the invention in which the pockets of a retaining ring 48 are adapted to contain rollers employed as antifriction elements is shown in FIG. 5. Here the axially inward end of each inner groove 50 forms a planar end surface 52. Similarly, the axial inward end of each outer groove 54 (only half of which is shown in FIG. 6) forms a planar end surface 56. The end surfaces 52 and 56 thus define parallel axially spaced radial planes, and the spacing between the end surfaces is substantially equal to the axial length of a roller.

FIG. 6 shows another retaining ring 57 similar to that shown in FIG. 4. It is adapted for use with balls and the radially extending flange 17 of FIG. 1 is omitted (numbers common to FIGS. 4 and 6) denote the same elements. In this embodiment, each groove 38, 40 is provided with two integrally formed projective detent formations 58 which extend into the grooves and circumferentially into the semi-cylindrical walls 34, 36 of the pockets 42. Thus, the detents 58 are in slight interference with the antifriction-element locating profile of said pocket, in terms of the projection of said profile along the radially directed axis of the pocket. This causes the retaining ring 57 to pilot more positively on the ball-shaped antifriction elements 14.

All embodiments of the retaining rings shown in FIGS. 1–6, as well as many variations and modifications thereof can be readily manufactured by injection molding plastic using mold pieces that are movable in the axial direction only. A technique for making the retaining ring 57 of FIG. 6 is shown in FIG. 7, by way of example.

The retaining ring 57 is formed in an annular mold cavity between two circumferentially disposed cylindrical walls, an inner wall 60 and an outer wall 62 (only fragmentary portions of these walls being shown in FIG. 7). A first core piece 64 forms a first radially extending wall 66 connecting inner and outer walls 60 and 62 when the mold is closed. A second core piece 68 forms a second radially extending wall 70 axially spaced from the first radial wall 66.

A first plurality of angularly spaced groove forming projections 72 is attached to the first core piece 64. These projections 72 extend axially into the annular mold cavity between the inner and outer walls but do not reach the opposing wall 70 when the mold is in its closed, injection receiving position.

A second plurality of projections 74 extends axially from the second core piece 68 into the annular cavity of the mold in the direction of the first radial wall 66. The second projections 74 are in angular registration with the first projections 72. The outer surfaces of the first projections 72 are in slidable engagement with the inner surface of the outer cylindrical wall 62, and the inner surfaces of the second projections 74 are in slidable engagement with the outer surface of the inner cylindrical wall 60. The inner diameter of the first projections 72 is substantially equal to the outer diameter of the second projections 72.

When the mold is to be placed in its injection receiving position, the first and second core pieces 64 and 68 are moved axially toward each other until the radial walls 66 and 70 engage the axially opposed ends of the inner and outer cylindrical walls 60 and 62. At this point, the projections 72 and 74 extend partially across the axial spacing between the axially opposed ends of the cylindrical walls 60 and 62. The inward ends of angularly registering first and second projections 72 and 74 overlap. The innermost end portion of each projection 72, 74 is rounded to form a semi-circle. The diameters of overlapping semicircular end portions that are parallel to the radial walls 60 and 62 are in registry with each other. Thus, the area of overlap of two angularly registering projections 72, 74 forms a circle.

After the plastic has been injected into the mold cavity and allowed to set, the mold is opened by producing relative axial movement between the core pieces 64 and 68 so that the retaining ring 76 thus formed can be removed. It is not necessary for any parts of the mold to move radially.

An additional feature of the retaining ring shown in FIG. 7 consists of a series of relief slots 78 (not shown in FIG. 6) formed between adjacent grooves 24, 25. These relief slots 78 are formed by smaller projections 80 attached to the core pieces 64 and 68 between the larger projections 72 and 74. The purpose of the relief slots 78 is to facilitate elastic deformation of the ring when it is removed from the mold so that the detents can disengage the recesses 80 on the sides of the projections 72 and 74 in which they are formed during the molding process.

The apparatus and method of the invention is described above with reference to specific exemplary embodiments.

There are, of course, other variations and modifications which fall within the scope of the invention defined as by the appended claims. For example, in the arrangement of FIG. 4, the slight radial interference between groove walls and the ball need not be at both radially outer and radially inner offsets from the cylinder which contains the path of ball centers. It suffices for ball-piloted support of the retainer ring that only one of these inner and outer offset interference should exist, for all the pockets of the retainer, as will be understood.

I claim:

1. A method of making a retaining ring for holding a plurality of like antifriction elements in angularly spaced relation comprising the steps of:
   injecting plastic into a mold cavity defined by a cylindrical outer wall, a cylindrical inner wall concentrically arranged with respect to said outer wall to form an annular cavity therebetween, a first core piece forming a first radially extending wall joining the inner and outer walls, a second core piece forming a second radially extending wall axially spaced from the first radially extending wall joining the inner and outer walls, a first plurality of like angularly spaced radially inner arcuate groove-forming projections attached to the first core piece and extending axially into the mold cavity in axially slidable engagement with the outward cylindrical surface of the inner wall, and a second like plurality of similarly spaced radially outer arcuate groove-forming projections attached to the second core piece and extending into the mold cavity in axially slidable engagement with the inward cylindrical surface of the outer wall, the outer diameter of the projections of the first core piece being substantially the same as the inner diameter of the projections of the second core piece, and the inner and outer projections being in angular registration and in axial overlap;
   allowing the plastic to set within the mold cavity;
   causing outward relative axial movement between at least one of the first and second core pieces relative to said inner and outer walls, whereby a like plurality of radially continuous openings are defined in the molded ring at the locations of angular and axial overlap; and
   removing the retaining ring thus formed from the mold cavity.

2. The method of claim 1, wherein said projections have semi-circular end portions extending axially into the annular mold cavity, each projection of the first plurality being in angular registration with one projection of the second plurality and overlapping the registering projection of the second plurality such that the overlapping area is substantially circular thereby forming a retaining ring adapted for use with ball-shaped anti-friction elements.

References Cited

UNITED STATES PATENTS

| 2,554,008 | 5/1951 | Burger | 264—262 X |
| 3,182,218 | 5/1965 | Videtic | 264—328 X |
| 3,559,249 | 2/1971 | Patton | 264—328 X |

FOREIGN PATENTS

| 14,093 | 1964 | Japan | 264—328 |

RICHARD R. KUCIA, Primary Examiner

U.S. Cl. X.R.

264—262, 318